United States Patent Office 3,513,630
Patented May 26, 1970

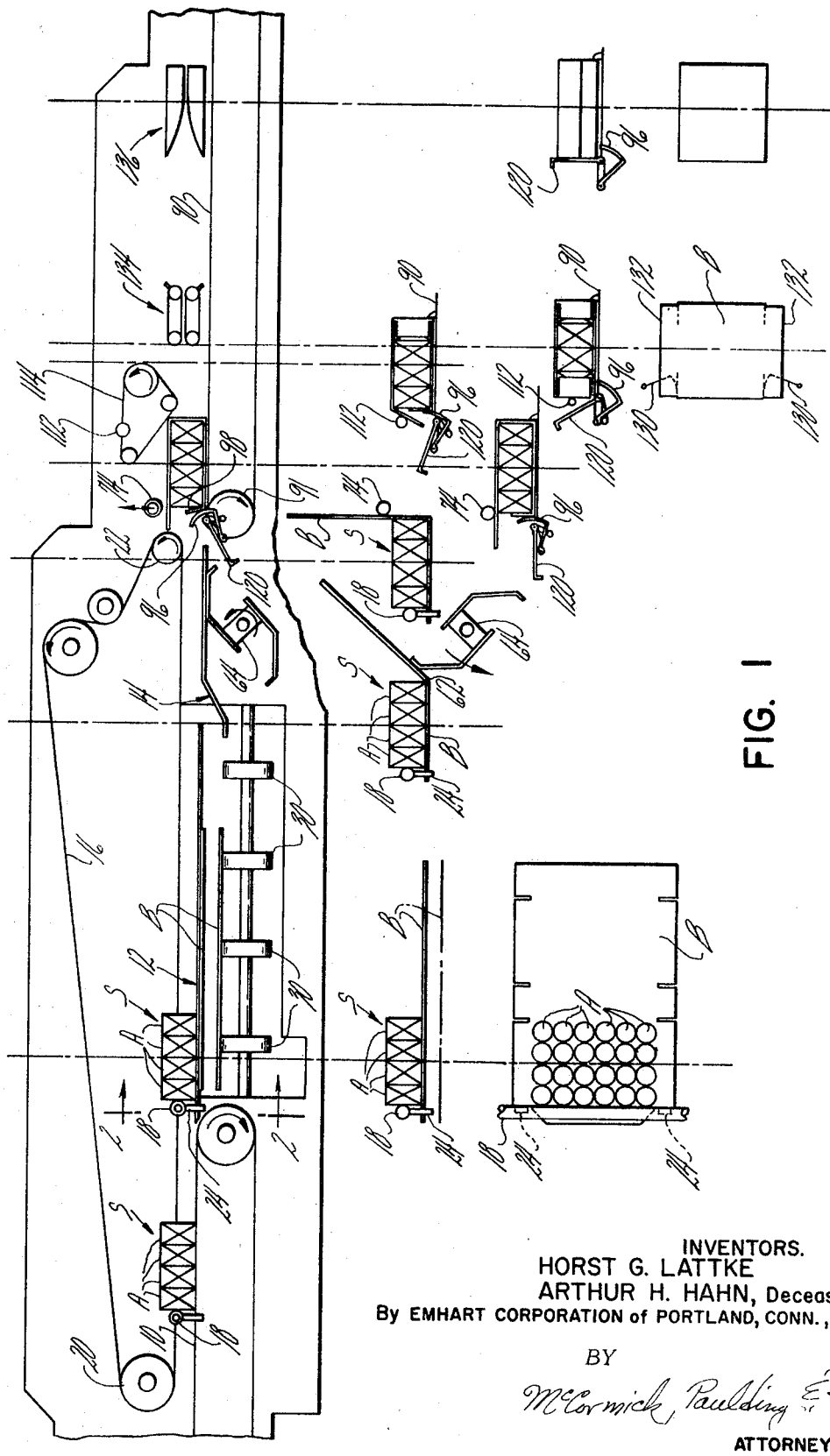

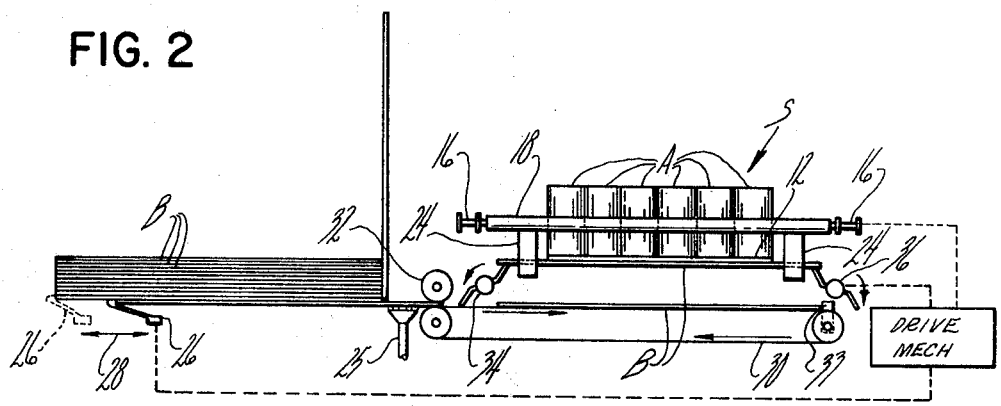
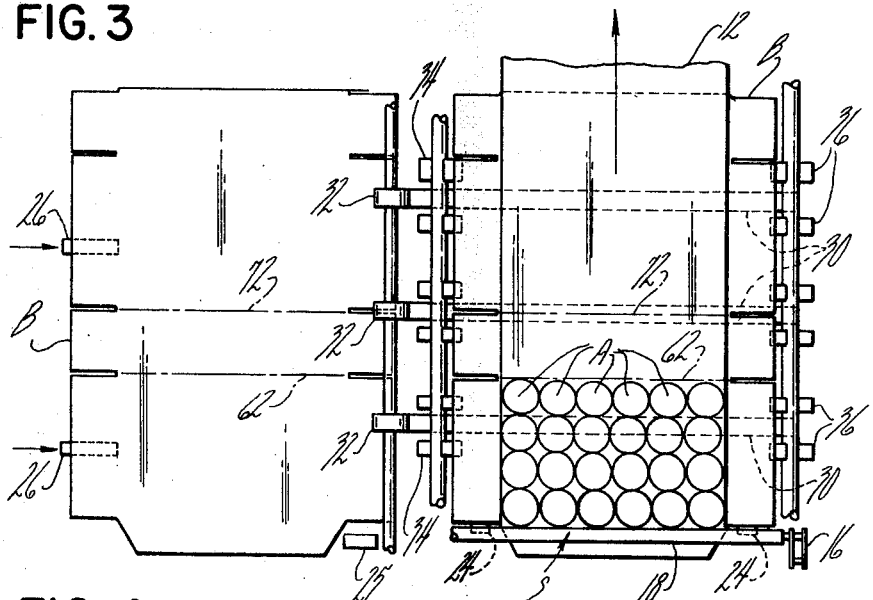
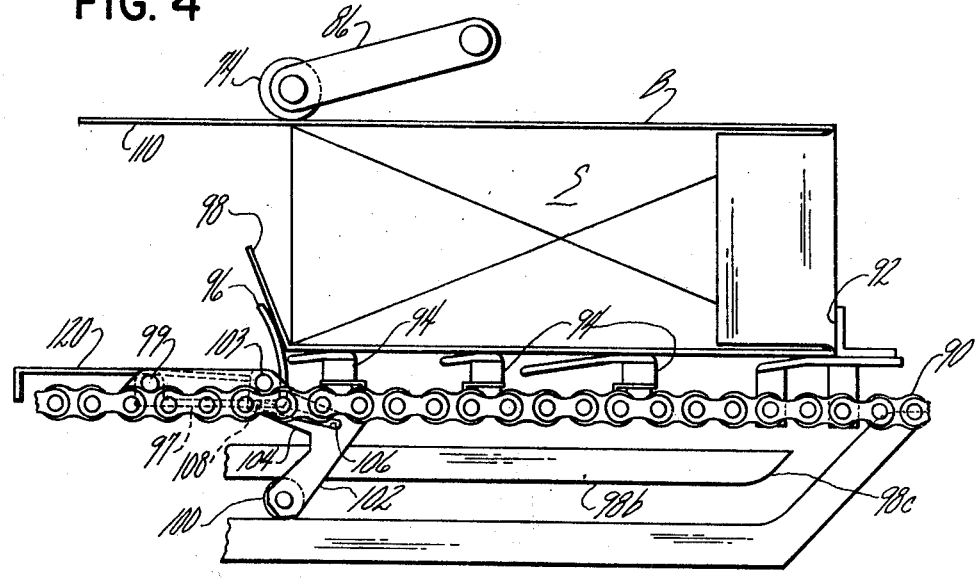

3,513,630
PACKING MACHINE WHEREIN FLAT BLANKS ARE FOLDED AROUND ARTICLE GROUPS FED CONTINUOUSLY THERETHROUGH
Horst G. Lattke, Middletown, and Arthur H. Hahn, deceased, late of Wethersfield, Conn., by Emhart Corporation of Portland, Conn., assignee, assignors to Emhart Corporation, Bloomfield, Conn.
Filed Oct. 12, 1967, Ser. No. 676,999
Int. Cl. B65b *11/12*
U.S. Cl. 53—209                                      25 Claims

ABSTRACT OF THE DISCLOSURE

Segregated groups of articles are fed through the machine first by a flight bar conveyor, and then by a pocket chain conveyor. A stack of flat packing case blanks is stored in a magazine alongside the flight bar conveyor, and fingers withdraw the lowermost blank in the stack so that belt conveyors can move the blank to a preliminary position spaced below a deadplate across which the article groups are advanced by the flight bar conveyor. Counter-rotating blank lifting fingers then raise the blank against the underside of the deadplate so that depending fingers on the flight bars advance the blank together with an associated article group off the downstream edge of the deadplate. A rotary device downstream of the deadplate creases the blank at the lower front corner of the article group, and a vertically reciprocable roller creases the blank at the upper front corner thereof to form the blank into a U-shaped configuration. The pocket chain conveyor receives the U-folded case, with its article group, and each pocket includes a rear gate for folding the trailing bottom flap upwardly against the rear side of the article group. An overhead flight bar then folds the trailing top flap downwardly and a second gate on the pocket chain holds both these flaps in place while the laterally opposed ends of the case are folded in a conventional manner.

SUMMARY OF INVENTION

This invention relates to machines for packaging groups of articles as they are being fed in one direction, and deals more particularly with machines for feeding flat cartons or blanks in the same direction so that a portion of the blank can be folded around the article group as both the blanks and the articles are advanced through the machine.

One object of the present invention is to provide a machine of the foregoing character which incorporates novel mechanism for successfully feeding blanks in timed relationship with a high speed conveyor for advancing the article groups.

Another general object of the invention is to provide a machine of the foregoing character wherein the blanks are fed together with associated article groups of said high speed conveyor, and wherein the blanks are folded into a U-shaped configuration as this conveyor feeds the blanks and associated article groups continuously through the machine.

Another general object of the present invention is to provide a machine of the foregoing character wherein the blank is folded into a U-shaped configuration around the article group successively by a rotary device, and by a vertically reciprocable roller, both of which are operable in timed relationship with the movement of said article group by the high speed conveyor.

Another general object of the present invention is to provide a machine of the foregoing character wherein the U-folded blank and the article group therein are carried through a downstream portion of the machine by a conveyor having pockets, the rear side of which pockets are defined by hinged gates which fold the trailing portions of the blank and which hold the trailing portions in folded positions during subsequent operations on the case.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

BRIEF DESCRIPTION OF DRAWINGS

FIG. 1 is a schematic view of the overall machine showing the case blank at successive stages of its formation into a packing case enclosing an associated group of articles, each of the sub-views being tied to the schematic of the overall machine by construction lines indicating the location of the blank at a particular stage in its formation.

FIG. 2 is a schematic view of the mechanism for feeding blanks successively to a flight bar conveyor which advances the article groups through the first portion of the machine, being taken along the line 2—2 of FIG. 1.

FIG. 3 is a plan view of the blank feeding mechanism shown in FIG. 2.

FIG. 4 is a detailed view of the pocket chain conveyor for feeding the U-folded case through a downstream portion of the machine.

DETAILED DESCRIPTION

Figure 5:
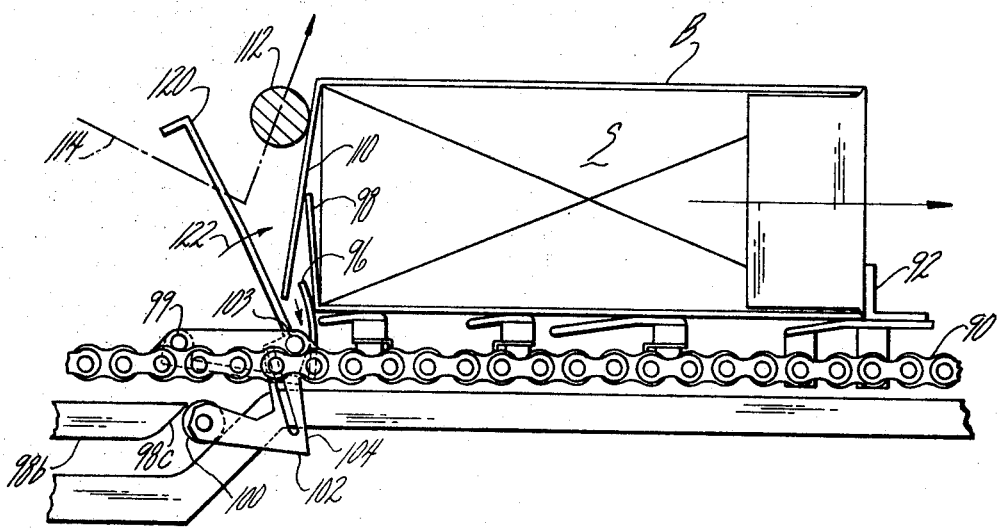
FIG. 5 is a view similar to FIG. 4 taken at a slightly later instant of time wherein the trailing top and bottom flaps of the case are folded about the rear side of the article group.

Turning now to the drawings in greater detail, FIG. 1 shows, schematically a machine of the present invention wherein articles A, A such as conventional cans are fed from left to right in a continuous manner through the machine. A conventional conveyor belt 10 feeds the articles in segregated groups or slugs S, S into the machine. The articles having been segregated into groups by suitable means (not shown).

Article conveyor means is provided in the machine for feeding the groups, or slugs S, S across a deadplate 12, which deadplate extends from the downstream end of the infeed conveyor 10 to an inclined ramp surface 14 to be described. Preferably, the means for feeding the groups of articles across the deadplate 12 comprises a flight bar conveyor 16 having a plurality of flight bars 18, 18 for engaging the rearmost cans in each individual group or slug. The flight bar conveyor 16 is of conventional construction comprising a pair of side-by-side endless chains entrained over a drive sprocket 19 and end sprockets 20 and 22 so that the flight bars 18, 18 can move the slugs off the infeed conveyor 10 and across the deadplate 12 and off the downstream edge of the deadplate.

A plurality of packing case blanks or cartons in the flat condition, are stacked one on top of another in a magazine provided to one side of the article conveyor 16 and means is provided for feeding these blanks individually beneath the deadplate 12 so that depending fingers 24, 24 arranged outboard of the article engaging portion of the flight bar 18 engage the trailing edge of a blank B to feed the blank beneath the deadplate while at the same time advancing the slug S across the upper surface of the deadplate 12.

The means for feeding blanks B, B to the above-mentioned position beneath the deadplate is shown to best advantage in FIGS. 2 and 3. FIG 2 comprises a vertical sectional view looking downstream, as indicated by the line 2, 2 of FIG. 1, and as shown therein a magazine for storing a plurality of blanks in a stack to one side of the deadplate 12 is provided with a bottom opening so that a reciprocable spring finger 26 can be moved between the positions shown in full and broken lines and as indicated by the arrow 28 to withdraw the lowermost blank from the stack in timed relationship with the movement of a previously withdrawn blank from beneath the deadplate 12 by the flight bar 18. As shown in FIG. 3, two such spring fingers 26, 26 are adapted to engage the side edge of a blank B so as to move the lowermost blank through the distance shown so that its opposite side edge will project beyond the stack. A continuously operating series of side-by-side belt conveyors 30, 30 and cooperating pressure rolls 32, 32, move the blank to a preliminary position against stops 33, 33 provided at the downstream ends of the conveyor belts 30, 30.

Still with reference to FIGS. 2 and 3, means is provided for raising each blank from said preliminary position on the belt conveyors 30, 30 to the above-mentioned position beneath the deadplate 12 in timed relationship with movement of the article conveyor 16, and hence with the reciprocable spring fingers 26, 26 which withdraw the lowermost blank from the magazine as described.

Preferably, said means for raising each blank comprises counter-rotating blank lifting fingers 34, and 36 engageable with opposite marginal edge portions of each blank B for raising the blank off the belt conveyors before the next succeeding blank is fed from the stack, and after the blank beneath the deadplate 12 is moved downstream by the flight bar 18 of the article conveyor 16. Preferably the lifting fingers are arranged in a plurality of pairs on shafts disposed on opposite sides, respectively, of the blank to be raised as shown in FIG. 3. Each of the fingers 34 and 36 includes two diametrically opposed radially outwardly projecting blank engaging portions, and an intermittent motion mechanism is provided for rotating the fingers in timed relationship with movement of the blank from beneath the deadplate. The intermittent motion mechanism is shown schematically in FIG. 12 wherein a gear box 40 is drivingly connected to a motor M. A belt 38 is driven from the gear box 40, which gearbox also drives the flight bar conveyor 16 through a sprocket 23 and intermediate timing belts 42 and 44. The intermittent motion mechanism for the rotating fingers 34 and 36 comprises a Geneva drive mechanism 39 including a continuously rotating crank wheel 46 driven by the belt 38 from the gearbox 40. The crank wheel 46 is drivingly connected to the slotted Geneva wheel 50, which operates the counter-rotating fingers 34 and 36 through timing belts 52, 54 and 56 and through meshing counter-rotating gears 58 and 60. The fingers 26, 26 are reciprocated in time with fingers 34 and 36 through a link 48 connected to the wheel 46.

Figure 12:
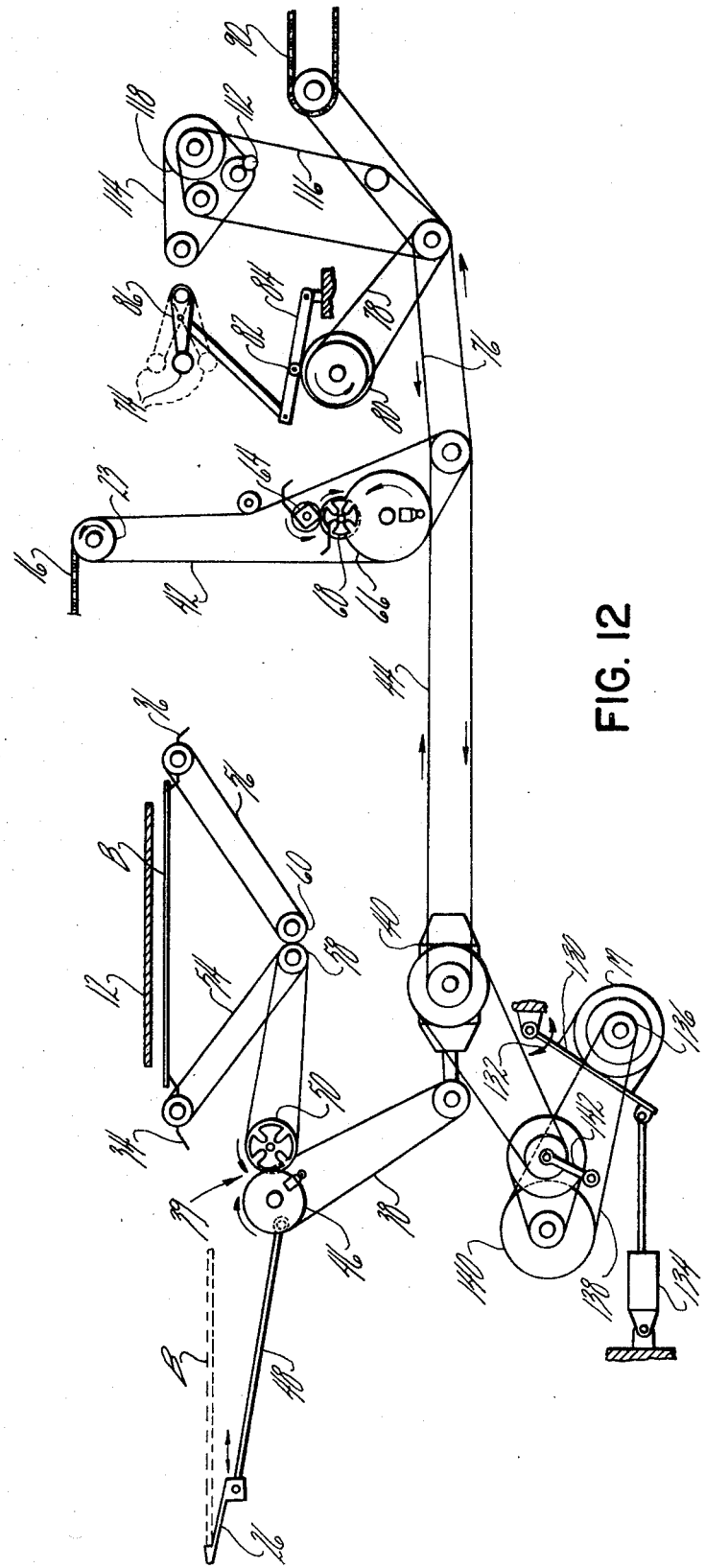
FIG. 12 is a schematic view of the drive mechanism utilized for operating each of the various components of the machine.

In further accordance with the present invention means is provided for shaping the blank B to a generally U-shaped configuration around the forward end portion of each slug S as the blank and slug are fed off the downstream edge of the deadplate 12 by the flight conveyor 16. Preferably, and as best shown in FIG. 1 said means for folding the blank comprises lifting means for raising the leading portion of each blank after it has moved off the deadplate 12 and up the ramp 14 to fold the blank along a lower front fold line indicated generally at 62. The blank is so folded as it is being fed downstream by the flight bar 18. The means for raising this portion of the blank comprises a rotary lifting device having at least one radially outwardly extending arm which is curved in a direction opposite that of its rotation for folding the blank along the line 62. As shown two such outwardly extending arms are provided on the rotary device 64, and an intermittent motion mechanism is provided for rotating the device in timed relationship with movement of the blanks by the flight bar 18. Referring more specifically to FIG. 12, the intermittent motion mechanism comprises a continuously driven crank wheel 66 and an intermittently driven Geneva wheel 68 which is geared to the rotary device 64. The continuously driven wheel 66 is driven by the same timing belt 42 used to drive the flight bar conveyor 16 through sprocket 23 as described hereinabove. Thus, as the blank B is moved off the deadplate 12 and across the ramp 14 the slug S will be carried on the rear or aft portion thereof as indicated in FIG. 3, and the intermittently rotating device 64 will raise the forward or leading portion thereof as the slug and blank are advanced by the flight bar 18. The inclined ramp surface 14 serves to lift the leading portion of the blank B slightly in order to initiate the lifting action resulting from the rotary device 64.

Figure 7:
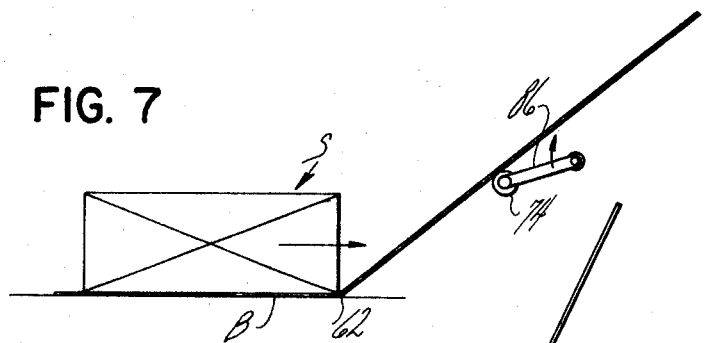
FIGS. 7, 8, 9, 10 and 11 show in schematic fashion an intermediate portion of the machine wherein a vertically reciprocable roller folds the raised leading portion of the blank into a U-shaped configuration around the article group as both are fed in the direction indicated.
Figure 8:
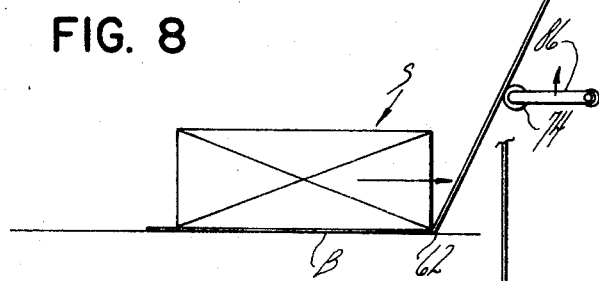
Figure 9:
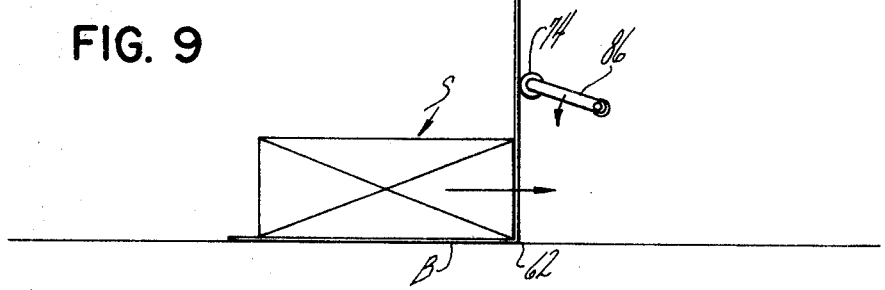
Figure 10:
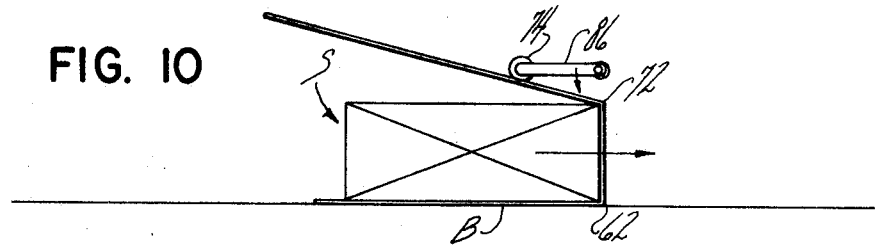
Figure 11:
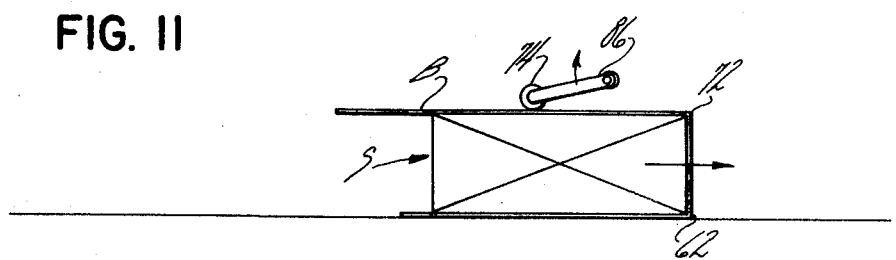

In further accordance with the present invention means is provided above the path of movement of the slug S for engaging the raised leading portion of the advancing blank to fold it through the 90° position and to fold it along an upper front fold line 72 whereby the blank is formed into a generally U-shaped configuration around the front end of the advancing slug S. Preferably, and as best shown in FIGS. 7 through 11 inclusively, said means for engaging the raised leading portion of the blank B to fold it along said front fold line 72 comprises a roller 74 extending laterally across the path of movement of the blank B and the slug S. While it is conventional practice to provide a roller mounted on a fixed axis for accomplishing this U-shaped folding function, it is a feature of the present invention that means is provided for moving the roller 74 between raised and normal positions as the slug is fed at high speed therepast. As shown in FIG. 7, the roller 74 is initially in a normal position wherein it would just clear the top surface of the slug S. In FIG. 8 the roller 74 has been raised slightly to an intermediate position, and in FIG. 9 the roller is in its raised position as the front side of the group of articles or slug S is fed therepast. In FIG. 10 the roller is returned to the intermediate position and the blank B has been folded along the upper front fold line 72. Prior to the time when the slug S clears the roller 74, the roller is returned to its normal position as shown in FIG. 11 wherein it holds the blank against the top of the slug, and the roller is maintained in this position until it engages the raised portion of the next succeeding blank B. FIG. 12 shows the means for oscillating the roller 74 in timed relationship with the movement of the blanks by the article conveyor 16. Timing belts 76 and 78 rotate a cam 80 in the direction indicated with the result that a cam follower 82 is raised and lowered in timed relationship with the speed of movement of the blanks by the article conveyor 16. The cam follower 82 is mounted on a lever 84 the free end of which lever is connected through a link, to a crank arm 86, upon which crank arm the roller 74 is provided. The link permits the vertical travel of the roller 74 to be adjusted in a convenient manner so as to accommodate slugs of cans of various height.

After each group of articles has been partially enclosed in its associated U-folded blank by being moved beneath the vertically reciprocable roller 74, it is received on a pocket chain conveyor 90 having a series of stops 92 defining the forward end of each pocket, the forward side of each U-shaped case or blank being positioned against a stop by the flight bar conveyor 16.

As best shown in FIG. 1, the rear or trailing bottom flap 98 of the case being received on the pocket chain is moved upwardly by an arcuate gate 96 which moves as the pocket chain moves over the sprocket 91 in the direction indicated. This arcuate, or first gate 96 comprises, at this moment, the rear side of this particular pocket. FIG. 4 shows the first gate 96 at a slightly later instant of time, that is after this gate has moved upwardly around the sprocket 91. As there shown, the U-folded case or blank B is held between the first gate 96 and the stop 92 on the guides 94, 94, all of which elements are mounted on the pocket chains 90, 90.

The first gate 96 comprises an L-shaped member having a flap engaging portion of arcuate shape which extends upwardly beyond the chain 90, and a rearwardly extending leg portion 97 which is pivotally connected to a point on the chain defined by pivot pin 99. The first gate 96 is held in the raised position shown in FIGS. 1 and 4 as the pocket chain rotates around the sprocket 91, by a cam follower 100 which rides in a slot 98. The slot 98 includes a downstream portion not shown in FIG. 4 which is curved to correspond to the curvature of the sprocket 91. The cam follower 100 is carried on one arm 102 of a bell crank which is pivotally supported on a second pivot pin 103 on the pocket chain 90. The bell crank has its other arm 104 provided with a slot 106 for receiving a pin 108 on the first gate 96. Thus, as long as the roller 100 rides in the slot 98b, the first gate 96 is maintained in its raised position and thereby holds the trailing bottom flap 98 in the position shown in FIG. 4.

Figure 6:
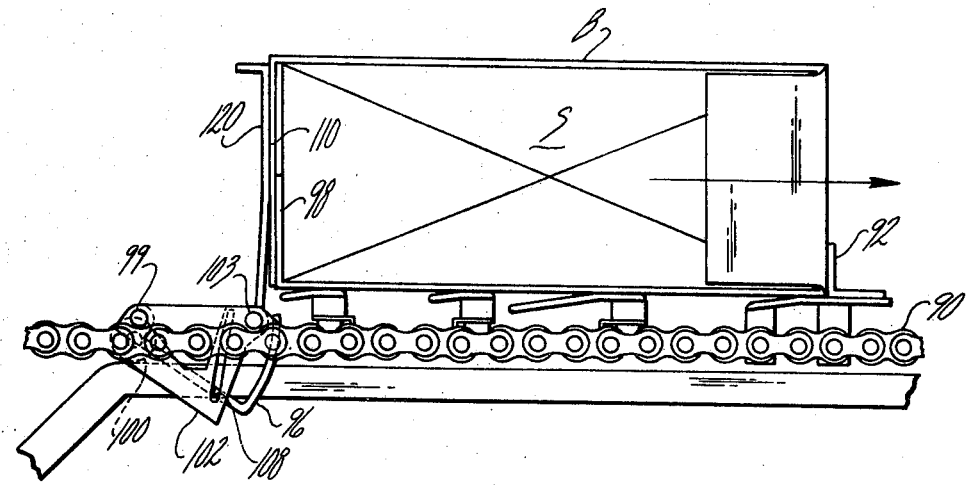
FIG. 6 is a view similar to FIGS. 4 and 5 being taken at a still later instant of time.

The trailing top flap 110 of the U-shaped blank B is initially in the position shown in FIG. 4 as a result of the roller 74 having folded the upper panel of the blank B against the top surface of the slug S. A top flap folding flight bar 112 is provided between laterally opposed flight bar conveyor chains 114, 114 as shown in FIG. 1, and the movement of the chains 114, 114 is coordinated with movement of the slug and its U-folded blank through a timing belt 116 best shown in FIG. 12 which drives the timing belt sprocket 118 in timed relationship with the pocket chain conveyor 90. More particularly, the flight bar 112 is so timed with respect to the pocket chain conveyor 90 that it folds the trailing top flap 100 downwardly behind the flap 98 which has been folded by the gate 96 in the manner just described. The flight bar 112 follows the path indicated in FIG. 5 by the broken line at 114, and a second gate on the pocket chain is provided for holding the trailing flaps 110 and 98 in their folded positions so as to permit the adhesive applied to the bottom flap to set. The second gate 120 is hingedly connected to the pocket chains 90, 90 at the pivot pin 103, and the second gate 120 also comprises a fixed extension of the bell crank arm 104. Thus, as the roller 100 rides upwardly in the slot segment 98C, it will be apparent that the bell crank pivots in a clockwise direction causing arm 104 and its extension, the second gate 120, to pivot clockwise in the direction of the arrow 122 so as to assume the position shown in FIG. 6. At the same time, the first gate 96 is pivoted downwardly about its axis of rotation defined by the pin 99. Thus the gates 96 and 120 operate in timed relationship with one another to fold the trailing or rear side of the U-folded blank as shown in FIGS. 4, 5 and 6.

The semi-folded case or blank B is then conveyed through the remainder of the machine by the pocket chain conveyor 90 each case being held between the forward stop 92 and the second gate 120 so that its end panels can be readily folded by pivotally mounted vanes 130, 130 best shown in FIG. 1. The top and bottom end panels can then be glued by conventional means, indicated generally at 134 in FIG. 1, after which these end panels can be folded by plows, indicated generally at 136. The completely folded packing case is then removed from the pocket chain conveyor by conventional means.

Although the operation of the machine will be apparent to those skilled in the art from the foregoing description and drawings, it should be noted that there is provided means for varying the overall speed of its various components by varying the speed of the input shaft to the gearbox 40. As shown in FIG. 12, the gearbox 40 drives all of the machine's components through the various timing belts described hereinabove, and therefore, by providing an adjustable speed drive for the gearbox a simple means for varying machine speed can be included. As shown a motor M is pivotally mounted on a hinged bracket 130, which bracket is movable in the directions of the double ended arrow 132 by an actuating cylinder 134. A variable diameter, and hence variable speed pulley 136 is activated by pivotal movement of the bracket since belt 138 is entrained on the vari-speed pulley 136 and on a pulley 140 which rotates on a fixed axis as shown. Finally, a hand crank 142 is provided for pre-positioning the machine components in any desired orientation.

As so constructed, the machine can be started up at a speed which is slow enough that no jamming or toppling of cans occurs, the speed being subsequently increased to any desired production speed.

What is claimed is:

1. Apparatus for packaging articles comprising a deadplate, means for feeding groups of articles across said deadplate, means for feeding packing case blanks to a position beneath said deadplate, said means for feeding each group of articles across said deadplate also serving to feed a blank in the same direction beneath said deadplate so that a blank with a group of articles thereon is provided downstream of said deadplate, means for folding said blank into a U-shaped configuration enclosing the front side and the top of said group of articles, said means for feeding blanks to a position beneath said deadplate including a magazine for storing a plurality of said blanks in a stack to one side of said deadplate, means for withdrawing the lowermost blank from said stack, means for moving the blank so withdrawn in its own plane to a preliminary position wherein said blank is spaced below said position beneath said deadplate, and means for raising the blanks from said preliminary position to said position beneath said deadplate in timed relationship with said blank withdrawing means and said article feeding means.

2. Apparatus for packaging articles comprising a deadplate, means for feeding groups of articles across said deadplate, means for feeding packing case blanks to a position beneath said deadplate, said means for feeding each group of articles across said deadplate also serving to feed a blank in the same direction beneath said deadplate so that a blank with a group of articles therein is provided downstream of said deadplate, means for folding said blank into a U-shaped configuration enclosing the front side and the top of said group of articles, said means for feeding groups of articles across said deadplate comprises a flight bar conveyor having a plurality of flight bars each of which flight bars engages the rearmost articles in the various columns in each of said groups to advance said groups successively across said deadplate, and each of said flight bars having depending fingers mounted thereon outboard of said article engaging portion thereof for engaging the trailing edge of the blank beneath said deadplate to feed the blank and its associated articles past said deadplate and off the downstream edge thereof.

3. Apparatus for packaging articles comprising a deadplate, means for feeding groups of articles across said deadplate, means for feeding packing case blanks to a position beneath said deadplate, said means for feeding each group of articles across said deadplate also serving to feed a blank in the same direction beneath said deadplate so that a blank with a group of articles thereon is provided downstream of said deadplate, means for folding said blank into a U-shaped configuration enclosing the front side and the top of said group of articles, said means for folding said blank comprises means for raising the leading portion of each blank as it is moved off said deadplate to fold the blank along a lower front fold line, and means mounted above the path of movement of said articles for engaging the raised leading portion of the blank to fold the same along an upper front fold line whereby the blank is formed into a generally U-shaped configuration around the group of articles.

4. Apparatus for packaging articles comprising a deadplate, means for feeding groups of articles across said deadplate, means for feeding packing case blanks to a position beneath said deadplate, said means for feeding each group of articles across said deadplate also serving to feed a blank in the same direction beneath said deadplate so that a blank with a group of articles thereon is provided downstream of said deadplate, means for folding said blank into a U-shaped configuration enclosing the front side and the top of said group of articles, conveyor means for receiving the U-shaped blank with the group of articles therein, said conveyor means having a plurality of pockets into which the partially folded blanks are fed by said feeding means, each of said pockets including a stop against which the front side panel of the U-shaped blank can abut, and each of said pockets further including a first gate which is movable upwardly behind the group of articles to fold the trailing bottom flap against the rear side of said group of articles.

5. Apparatus according to claim 4 and further characterized by a trailing top flap folding flight bar mounted above the path of movement of said U-shaped blank on said pocket defining conveyor means, said flight bar being movable downwardly behind the U-shaped blank to fold the trailing top flap against the rear side of said group of articles.

6. Apparatus according to claim 5 wherein each of said pockets further includes a second gate, and means for moving said second gate against the folded bottom and top flaps as said first gate is moved downwardly and as said top flap folding flight bar is moved upwardly out of engagement with said bottom and top flaps respectively.

7. Apparatus according to claim 3 wherein said means for raising the leading portion of each blank comprises a rotary lifting device having at least one radially outwardly extending arm for folding each blank as it is fed off said deadplate, said rotary device being driven in timed relationship with said article feeding means.

8. Apparatus according to claim 7 wherein said rotary device includes a plurality of said outwardly extending arms, and an intermittent motion mechanism for rotating said arms in timed relationship with the movement of said blanks across said deadplate.

9. Apparatus according to claim 1 wherein said means for withdrawing said lowermost blank from said magazine comprises at least one reciprocable limited stroke finger engageable with one side edge of the blank to cause the opposite side edge of the blank to project beyond the stack, said means for moving the blank to said preliminary position comprising at least two parallel endless conveyor belts continuously driven in one direction, and stop means for holding the blank in said preliminary position.

10. Apparatus according to claim 9 wherein said means for raising each blank from said preliminary position to the position beneath said deadplate comprises counter-rotating blank lifting fingers engageable with the opposite side edges of the blank for raising the blank before the next succeeding blank is fed in said one direction by said conveyor belts and after the blank beneath said deadplate is fed downstream by said article feeding means.

11. Apparatus according to claim 10 wherein at least four counter-rotating blank lifting fingers are arranged in pairs on opposite sides respectively of the blank to be raised, two counter-rotating shafts arranged at either side of the blank to be raised for supporting said fingers, each of said fingers including two diametrically opposed radially outwardly projecting blank engaging portions, and an intermittent motion mechanism for rotating said fingers in timed relationship with the movement of said blank from beneath said deadplate by said article feeding means.

12. Apparatus according to claim 10 wherein said means for feeding groups of articles across said deadplate comprises a flight bar conveyor having a plurality of flight bars, each of said flight bars being engageable with the rearmost articles in the various columns in each of said groups to advance said groups successively across said deadplate, and each of said flight bars having depending fingers mounted thereon outboard of said article engaging portion thereof for engaging the trailing edge of a blank after it has been raised to said position beneath said deadplate and for feeding said blank past said deadplate and off the downstream edge thereof.

13. Apparatus according to claim 12 wherein said means for folding said blank comprises means for raising the leading portion of each blank as it is moved off said deadplate by said flight bar fingers whereby the blank is folded along a lower front fold line, and means mounted above the path of movement of said articles for engaging the raised leading portion of the blank to fold it along an upper front fold line whereby the blank is formed into a generally U-shaped configuration around the front side of the group of articles.

14. Apparatus according to claim 13 wherein said means for raising the leading portion of each blank comprises a rotary lifting device having at least one radially outwardly extending arm for folding each blank as it is fed off said deadplate, said rotary device being driven in timed relationship with said flight bar conveyor means for feeding said blank off said deadplate.

15. Apparatus according to claim 13 wherein said means for engaging the raised leading portion of the blank to fold it along the upper front fold line of said blank comprises a roller extending laterally across the path of movement of said blank and said group of articles, and means for moving said roller upwardly toward a raised position wherein it is spaced vertically above the path of movement of said articles as the front side of the group of articles is fed therepast, said roller moving means also serving to return the roller to a normal position wherein it is adjacent the top of said group of articles as the group clears said roller whereby the blank can be folded into said U-shaped configuration as the group of articles is moved at high speed by said flight bar conveyor.

16. Apparatus according to claim 15 and further characterized by conveyor means for receiving the U-shaped blank with each associated group of articles partially enclosed therein, said conveyor means having a plurality of pockets into which the partially folded blanks are fed by said flight bar conveyor, each of said pockets including a stop against which the front side panel of the U-shaped blank can abut, and each of said pockets further including a first gate which is movable upwardly behind the group of articles to fold the trailing bottom flap against the rear side of said group of articles.

17. Apparatus according to claim 16 and further characterized by a trailing top flap folding flight bar mounted above the path of movement of said U-shaped blank on said pocket defining conveyor means, said top flap folding flight bar being movable downwardly behind the U-shaped blank to fold the trailing top flap against the rear side of said group of articles.

18. Apparatus according to claim 16 wherein each of said pockets further includes a second gate, and means for moving said second gate against the folded bottom and top flaps as said first gate is moved downwardly and as said top flap flight bar is moved upwardly out of engagement with said bottom and top flaps respectively.

19. In an apparatus wherein a group of articles is partially enclosed in a packing case which is folded into a U-shaped configuration around the bottom, front and top sides thereof, the improvement comprising conveyor means for said articles and associated packing case, said conveyor means having a plurality of pockets for receiving said articles with top and bottom flaps trailing from the top and bottom panels of said U-shaped case, each of said pockets including a stop against which the front panel of the case can abut, and each of said pockets further including a first gate which is movable upwardly behind the group of articles to fold the trailing bottom flap against the rear side of said group of articles, a trailing top flap folding flight bar mounted above the path of movement of said U-shaped case on said pocket defining conveyor means, said top flap folding flight bar being movable downwardly behind the U-shaped case to fold the trailing top flap against the rear side of said group of articles, each of said pockets further including a second gate, and means for moving said second gate against the folded bottom and top flaps as said first gate is moved downwardly and as said top flap folding flight bar is moved upwardly out of engagement with said bottom and top flaps respectively.

20. The combination set forth in claim 19 wherein said pocket defining conveyor means comprises a pair of laterally spaced side-by-side endless chains, each of said stops comprising a cross bar connected at either end to corresponding points on each of said chains, each of said first and second gates being connected at their respective ends to one another and to corresponding points on each of said chains, one of said gates being pivotally connected to said chains and having a depending crank arm portion, a cam follower on said crank arm, and said means for moving said second gate against the folded flaps comprising a cam slot for said cam follower.

21. The combination set forth in claim 20 wherein said second gate has said depending crank arm upon which said cam follower is mounted, said first gate also being pivotally connected to said chains and having a pin which rides in a cam slot defined by said second gate for moving said first gate downwardly as said second gate is moved against the folded top and bottom flaps.

22. In an apparatus for packaging articles by wrapping an initially flat blank into a U-shaped configuration as the blank with a group of articles thereon is fed continuously in a given direction, the combination comprising conveyor means for feeding blanks in said given direction, a deadplate across which segregated groups of articles are fed in said given direction, a magazine for storing a plurality of blanks in a stack to one side of said deadplate, means for withdrawing the lowermost blank from said stack and feeding the blank so withdrawn to a position beneath said deadplate, means for moving the blank vertically so that said blank conveyor means advances the blank beyond the downstream edge of said deadplate in timed relationship with said blank withdrawing means and with the progress of said groups of articles across said deadplate so that a blank with an associated group of articles thereon is provided downstream of said deadplate, said blank conveyor means comprising a flight bar conveyor which also serves to advance said segregated groups of articles across said deadplate and off the downstream edge thereof, and wherein said means for moving the blank vertically comprises counter-rotating blank lifting fingers engageable with opposite side edges of each blank for raising the blank from a preliminary position to a position adjacent the underside of said deadplate before the next succeeding blank is withdrawn and fed to said preliminary position, said flight bar conveyor having flight bars which include depending fingers outboard of said article engaging portion for feeding the blanks as aforesaid.

23. The combination set forth in claim 22 wherein said means for withdrawing the lowermost blank and feeding the withdrawn blank to said preliminary position comprise at least one reciprocable limited stroke finger engageable with one side edge of the blank to cause the opposite side edge to project beyond the stack, at least two parallel endless conveyor belts continuously driven in one direction, and stop means for holding the blank in said preliminary position.

24. The combination set forth in claim 23 wherein at least four counter-rotating blank lifting fingers are arranged in pairs on opposite sides respectively of the blank to be raised, two counter-rotating shafts arranged at either side of the blank for supporting said lifting fingers, each of said fingers including two diametrally opposed radially projecting blank engaging portions, and an intermittent motion mechanism for rotating said fingers in time relationship with said flight bar conveyor.

25. In an apparatus for packaging articles by wrapping an initially flat blank into a U-shaped configuration as the blank with a group of articles thereon is fed continuously in one direction, the improvement comprising a deadplate, flight bar conveyor means for feeding groups of articles across said deadplate and including a portion extending below said deadplate, a magazine for storing a plurality of blanks in a stack to one side of said deadplate, means for withdrawing the lowermost blank from said stack and feeding the blank so withdrawn to a preliminary position wherein it is spaced below said deadplate, and means for raising the blank from said preliminary position to a second position beneath said deadplate wherein said flight bar conveyor serves to feed the group of articles across the deadplate and said extending portion serves to feed an associated blank from said second position in the same direction.

References Cited

UNITED STATES PATENTS

| 1,875,979 | 9/1932 | Beutel | 53—234 X |
| 1,885,910 | 11/1932 | Gwinn et al. | 53—234 X |
| 2,486,892 | 11/1949 | Sumida | 53—233 |
| 2,974,454 | 3/1961 | Andre et al. | 53—209 X |
| 3,108,414 | 10/1963 | Schleicher et al. | 53—48 |
| 3,287,880 | 11/1966 | Hansel et al. | 53—228 X |
| 2,932,929 | 4/1960 | Fahrenbach et al. | 53—209 X |

THERON E. CONDON, Primary Examiner

N. ABRAMS, Assistant Examiner

U.S. Cl. X.R.

53—233